US012766891B2

(12) United States Patent
Ojala

(10) Patent No.: US 12,766,891 B2
(45) Date of Patent: Oct. 20, 2026

(54) TYRE HAVING SOUND-ABSORBING MATERIAL AND A METHOD FOR MANUFACTURING THE SAME

(71) Applicant: NOKIAN RENKAAT OYJ, Nokia (FI)

(72) Inventor: Jari Ojala, Nokia (FI)

(73) Assignee: NOKIAN RENKAAT OYJ, Nokia (FI)

( * ) Notice: Subject to any disclaimer, the term of this patent is extended or adjusted under 35 U.S.C. 154(b) by 254 days.

(21) Appl. No.: 18/487,787

(22) Filed: Oct. 16, 2023

(65) Prior Publication Data

US 2024/0131875 A1 Apr. 25, 2024
US 2024/0227463 A9 Jul. 11, 2024

(30) Foreign Application Priority Data

Oct. 19, 2022 (FI) ..................................... 20225946

(51) Int. Cl.
*B60C 19/00* (2006.01)

(52) U.S. Cl.
CPC .................................. *B60C 19/002* (2013.01)

(58) Field of Classification Search
CPC .................................................... B60C 19/002
See application file for complete search history.

(56) References Cited

U.S. PATENT DOCUMENTS

2005/0155686 A1 7/2005 Yukawa
2007/0017619 A1* 1/2007 Yukawa ................ B60C 19/002 152/450
2007/0089824 A1* 4/2007 Yukawa ................ B60C 19/002 152/450
2009/0277551 A1 11/2009 Yukawa
2010/0276049 A1* 11/2010 Yukawa ................ B60C 19/002 152/450
2019/0143764 A1* 5/2019 Majumdar ......... B29D 30/0061 152/450

(Continued)

FOREIGN PATENT DOCUMENTS

CN 1978226 A 6/2007
EP 1577123 A1 9/2005

(Continued)

OTHER PUBLICATIONS

European Extended Search Report received for EP Serial No. 23201103.1 on Mar. 6, 2024, 13 pgs.

(Continued)

*Primary Examiner* — Justin R Fischer
*Assistant Examiner* — Philip N Schwartz
(74) *Attorney, Agent, or Firm* — Merchant & Gould P.C.

(57) ABSTRACT

A tyre includes a tread forming a part of an outer surface, and sound-absorbing material formed as a ribbon and attached to an inner surface of a body of the tyre. The ribbon extends from a first end of the ribbon to a second end of the ribbon and the shape of the ribbon tapers such that a thickness (Tr) of the ribbon decreases towards the second end of the ribbon. The first end of the ribbon is in contact with the second end of the ribbon, and/or a gap (G) is arranged between the first end of the ribbon and the second end of the ribbon such that a maximum width (Wg) of the gap (G), as measured along the body of the tyre, is at most 5 mm.

12 Claims, 7 Drawing Sheets

(56) References Cited

U.S. PATENT DOCUMENTS

2022/0080785 A1* 3/2022 Tsuji .......................... B60C 5/00

FOREIGN PATENT DOCUMENTS

| | | | |
|---|---|---|---|
| EP | 1728650 | A1 | 6/2006 |
| EP | 2017092 | A1 | 1/2009 |
| EP | 2239152 | A1 | 10/2010 |
| EP | 3706990 | A1 | 9/2020 |
| EP | 3970998 | A1 | 3/2022 |
| JP | 2010047053 | A | 4/2010 |

OTHER PUBLICATIONS

Finnish Office Action received for Finnish Application No. 20225946 on May 9, 2023, 10 pgs.

* cited by examiner

TYRE HAVING SOUND-ABSORBING MATERIAL AND A METHOD FOR MANUFACTURING THE SAME

CROSS-REFERENCE TO RELATED APPLICATION

This application claims priority from Patent Application No. 20225946 filed on Oct. 19, 2022 in Finland. The entire contents of the priority application is incorporated herein by reference.

TECHNICAL FIELD

The invention relates to tyres having noise-suppressing characteristics obtained by using sound-absorbing material. The invention relates to pneumatic tyres. The invention relates to tyres for passenger cars. The invention relates to methods for manufacturing such tyres.

BACKGROUND

Tyres having noise-suppressing characteristics are known e.g. from the document US 2005/0155686 A1. As shown therein, to suppress noise sound-absorbing material is provided to an interior of a tyre.

As shown in FIGS. 2 and 3 of that document a band-like noise suppressing body extends in the tyre circumferential direction on an inner side of a tyre. The ends of the band may be separated from each other; or the ends may be integrally connected to each other by adhesive.

It has been found that to improve the sound-suppressing properties of the tyre, preferably one should rather use more sound-absorbing material than less. Thus, the gap(s) (if any) in between the ends of the band-like element(s) should only be narrow.

As discussed above, if the ends of the band are connected to each other, they are connected by using adhesive. This reduces the problem of the sound-absorbing material wearing in use.

However, it has been found that joining the ends of the band-like element(s) together with adhesive requires a lot of manual work and still oftentimes the band-like element(s) tend to detach from the tyre in use.

Therefore, there is a need for a such a method that a band-like element (hereinafter a ribbon) can be attached to the inner surface of a tyre in a reliable manner so that no gaps or only a narrow gap is arranged between the ends of the ribbon. There is also a need for a tyre, wherein the ribbon is attached in a reliable manner so that no gaps or only a narrow gap is arranged between the ends of the ribbon. Moreover, in line with the prior art, the wear of the sound absorbing material in such a solution should be diminished. Finally, the noise-absorbing material should be applied in such a way that the mass of the tyre is balanced about the rotational axis.

SUMMARY

It has been found that the detachment problems of the ribbon are related to the ends of the ribbon compressing each other particularly on the side closer to the rotational axis of the tyre.

To this end, it has been found that by using such a ribbon, of which shape tapers towards an end of the ribbon so that its local thickness decreases towards the end of the ribbon, the ends of the ribbon on the inner side of the ribbon do not compress each other, which seemingly overcomes the problem. Moreover, at the same time, to have a lot a noise-suppressing material, a gap between the ends, if any, remains small.

Moreover, even if the noise-absorbing material of the ribbon is generally lightweight, a small gap or not gap at all, generally implies a better mass-balance than a wide gap; unless compensated by other gaps, which however, would imply decreasing the amount of the noise-absorbing material.

Finally, it has been found that the tapering shape of at least one end of the ribbon has the effects that a contact area (if any) of the ends of the ribbon remain small, which decreases the problem of the sound-absorbing material wearing in use.

The method and the tyre according to the invention is disclosed more specifically in the independent claims.

In a preferably embodiment, the shape of the ribbon tapers towards an end of the ribbon so that an angle of inclination is approximately 45 degrees (e.g. 15 to 75 degrees, or 30 to 60 degrees, or 40 to 50 degrees). This, on one hand relieves the compressive stress from the ends of the ribbon, and on the other hand ensures that a significant portion of the ribbon is non-tapering, which implies a reasonably high amount of the noise-suppressing material; and also implies a reasonably good mass balance.

In a preferably embodiment, the shape of the ribbon tapers towards only one end of the ribbon. Also this ensures that a significant portion of the ribbon is non-tapering, which implies a reasonably high amount of the noise-suppressing material; and also implies a reasonably good mass balance.

DETAILED DESCRIPTION

Figure 1A:
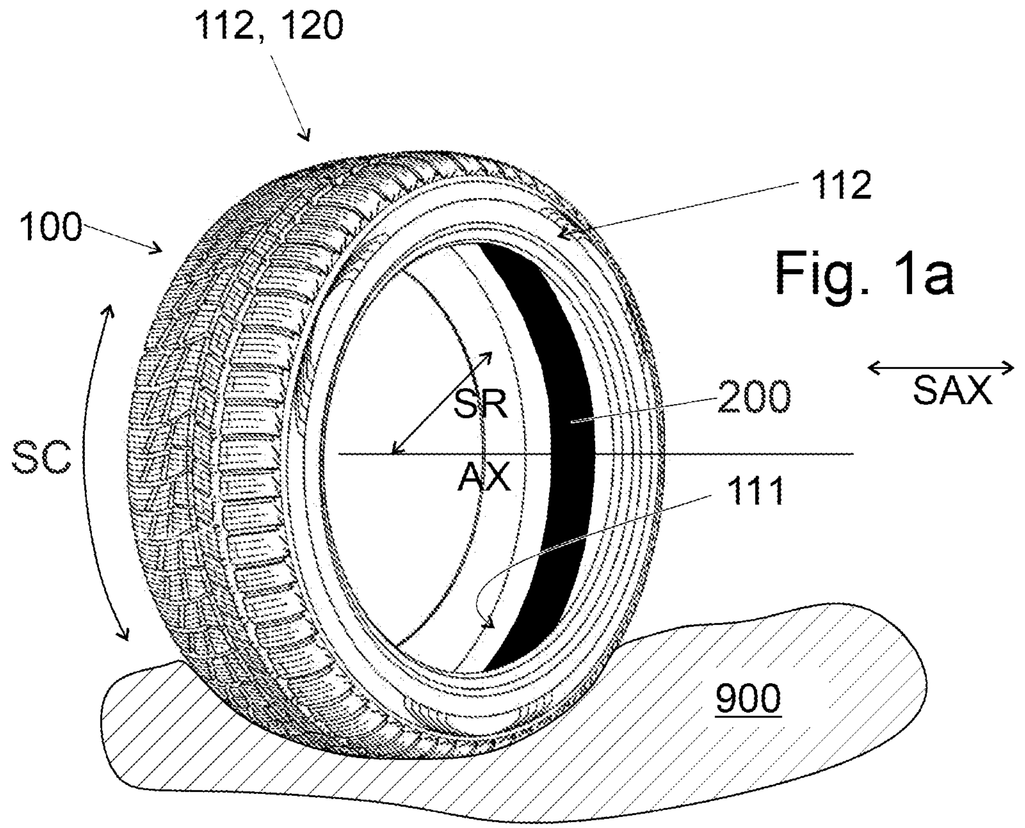
FIG. 1*a* shows in a perspective view, a tyre comprising a ribbon of noise-absorbing material, the tyre being arranged on a surface 900.

FIG. 1*a* shows in a perspective view a tyre 100. The tyre 100 is tubeless pneumatic tyre. The tyre 100 is tubeless pneumatic tyre intended for use as a tyre of a passenger car in regular road use. The tyre 100 comprises an inner surface 111, which is opposite to an outer surface 112 of the tyre 100. The tyre 100 comprises a tread 120 on its outer surface 112. The tread 120 has circumferential and transversal grooves, said grooves defining a number of tread blocks. The tread 120 is meant for a rolling contact against a ground surface 900, such as the road. The grooves are meant for draining water and/or slush that is possibly located on the ground surface away from the tread 120, so that the contact between the tread 120 and the ground surface 900 is as good and consistent as possible. Studs may be provided on the tread 120. The tyre 100 has a tubular shape, which defines an axis of rotation AX for the tyre 100. In use, the tyre 100 in configured to rotate about the axis of rotation AX.

Figure 3A:
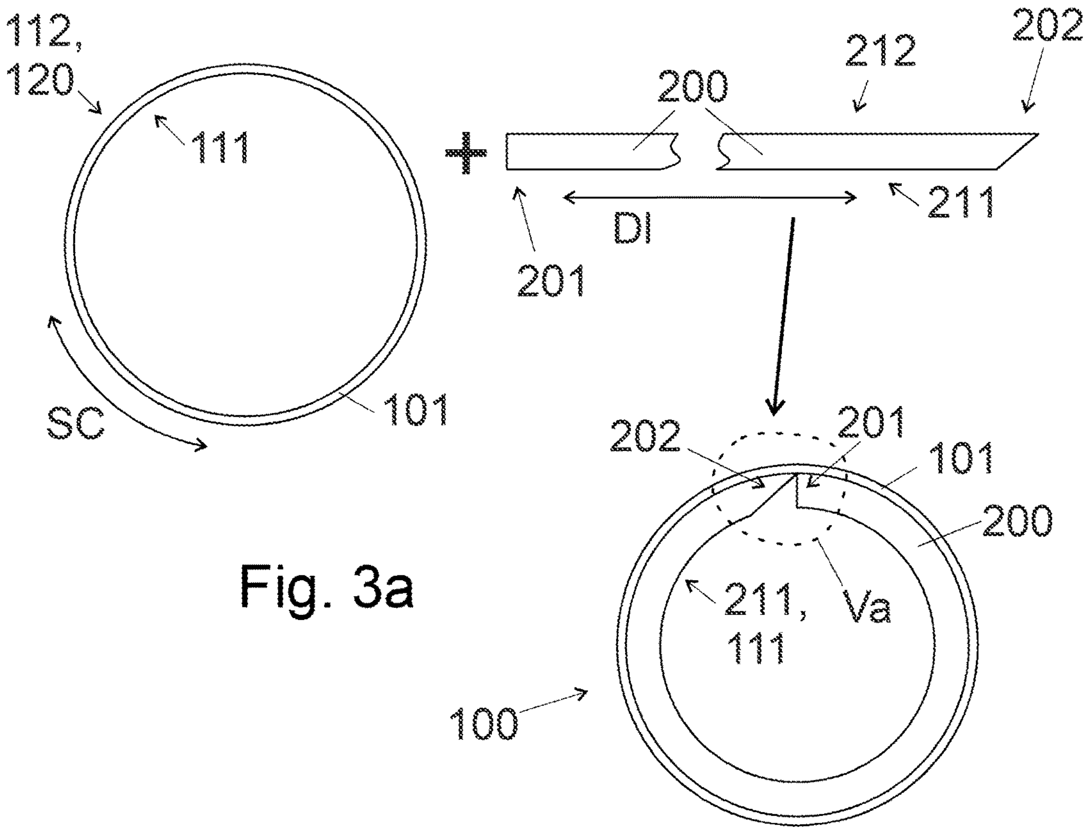
FIG. 3*a* shows attaching a ribbon to a body of a tyre to form the tyre, wherein a length of the ribbon is substantially equal to a circumference of an inner surface of the body of the tyre.
Figure 3B:
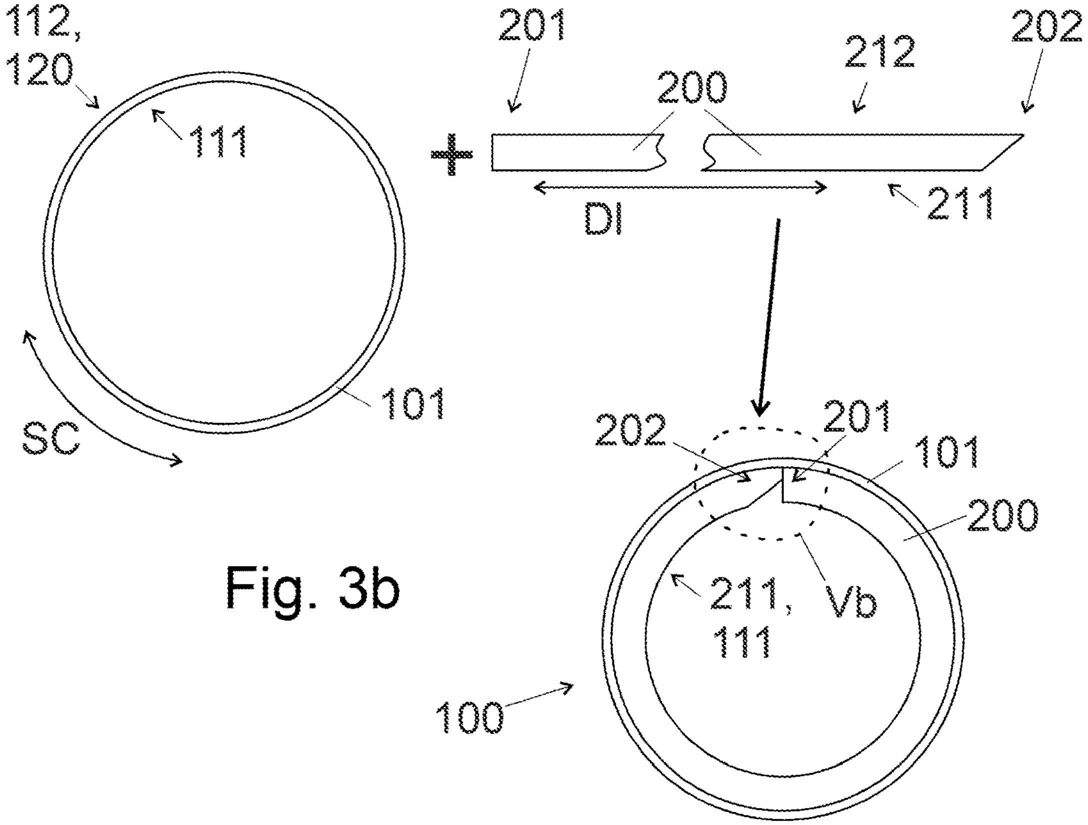
FIG. 3*b* shows attaching a ribbon to a body of a tyre to form the tyre, wherein a length of the ribbon is somewhat greater than a circumference of an inner surface of the body of the tyre.
Figure 3C:
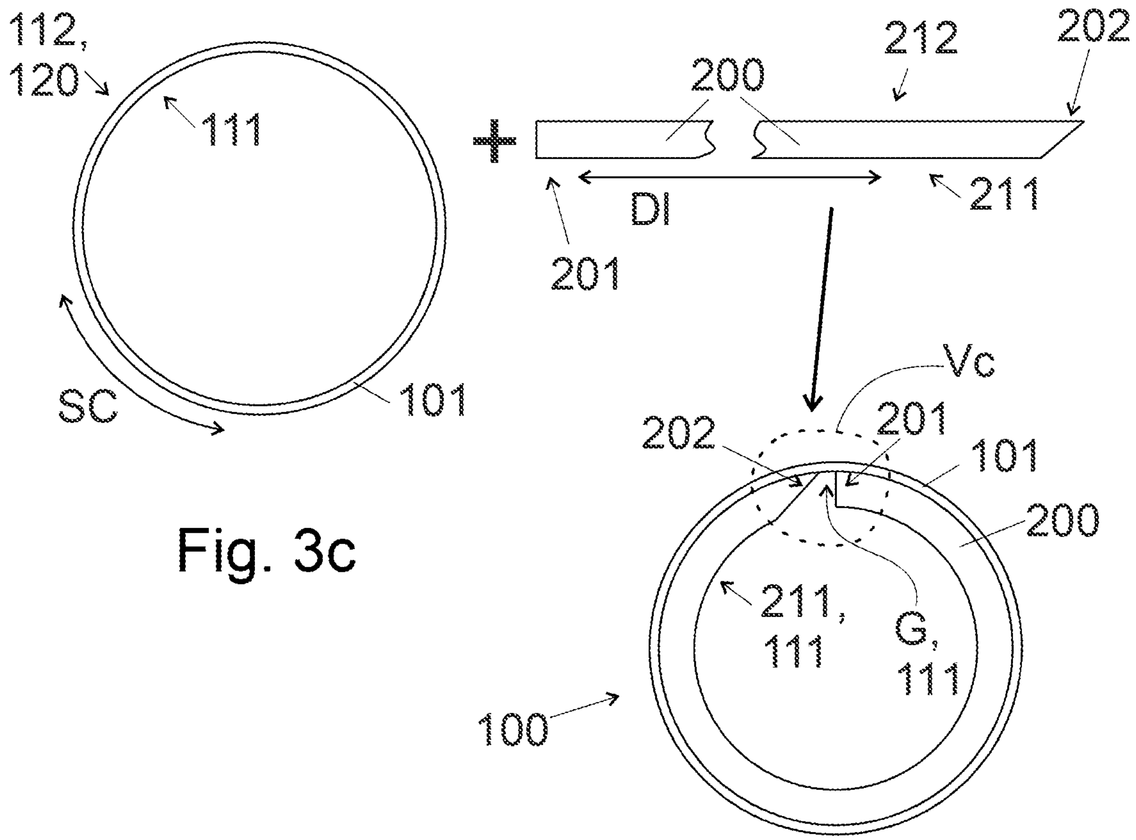
FIG. 3*c* shows attaching a ribbon to a body of a tyre to form the tyre, wherein a length of the ribbon is somewhat smaller than a circumference of an inner surface of the body of the tyre.

In order to reduce the noise generated by the tyre 100 in use, the tyre 100 comprises sound-absorbing material on an inner side of the tyre 100. The sound-absorbing material is formed as a ribbon 200 and attached to a body 101 of the tyre 100. Thus, the ribbon 200 comprises the sound-absorbing material. With reference to FIGS. 3*a* to 3*c*, the ribbon 200 is attached on the inner side of the body 101 of the tyre, particularly opposite to the tread 120, in such a way that a first main surface 211 of the ribbon 200 faces the axis AX of rotation of the tyre. The whole ribbon 200 needs not be opposite the tread 120; instead, the ribbon 200 may be e.g. wider than the tread 120. However, at least a part of the ribbon 200 is arranged opposite the tread 120. Typically, the first main surface 211 of the ribbon 200 forms a part of the inner surface 111 of the tyre 100. However, if needed, the ribbon 200 could be coated by some other material forming the inner surface 111. Thus, in an embodiment, the first main surface 211 of the ribbon 200 or a coating thereof forms a part of the inner surface 111 of the tyre 100.

Figure 1B:
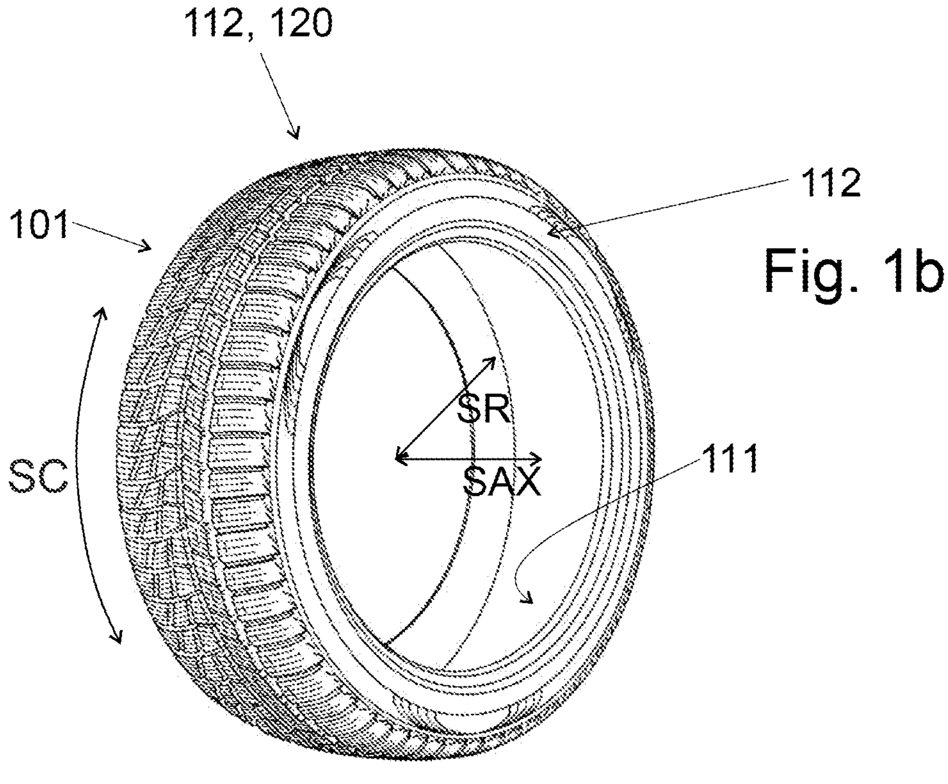
FIG. 1*b* shows in a perspective view, a body of the tyre of FIG. 1*a*, i.e. the tyre except the a ribbon of noise-absorbing material.
Figure 5A:
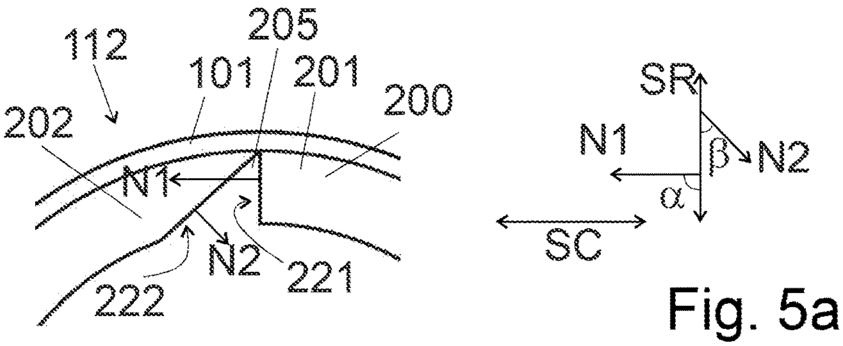
FIG. 5*a* shows the detail Va of FIG. 3*a* together with some directions of the detail.
Figure 5B:
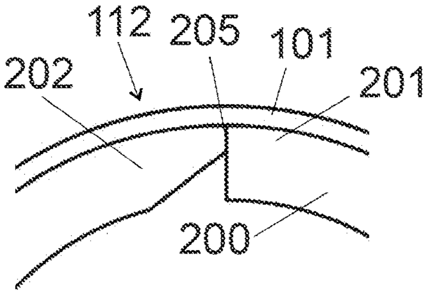
FIG. 5*b* shows the detail Vb of FIG. 3*b*.
Figure 5C:
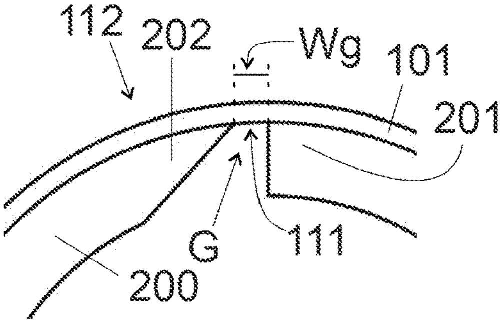
FIG. 5*c* shows the detail Vc of FIG. 3*c*.

As detailed below, the tyre 100 (e.g. of FIG. 1*a* or 1*c* to 1*f*) has been manufactured by attaching a solid ribbon 200 of the sound-absorbing material on an inner side of a body 101 (e.g. of FIG. 1*b*) of the tyre 101. Such a solid ribbon 200 comprises a first end 201 and a second end 202 (see FIGS. 1*e*, 1*f*, and 2*a*). Therefore, also in the tyre 100, the ribbon 200 comprises a first end 201 and a second end 202 as detailed in FIGS. 1*e*, 1*f*, 3*a*, 3*b*, and 3*c*. Referring to FIGS. 5*a* to 5*c*, a seam 205 or a gap G remains in between the first end 201 and the second end 202. In FIGS. 5*a* and 5*b*, wherein the ends 201, 202 are in contact with each other, the seam 205 is arranged in between them. In FIG. 5*c*, wherein the ends 201, 202 are not in contact with each other, the gap G is arranged in between them. Moreover, the ribbon 200 extends from the first end 201 of the ribbon 200 to the second end 202 of the ribbon 200. In particular, the ribbon 200 extends from the first end 201 of the ribbon 200 to the second end 202 of the ribbon 200 such that only one seam or gap is arranged in between the first end 201 and the second end 202.

As shown in FIGS. 3*a*, 3*b*, 5*a*, and 5*b*, in an embodiment, the first end 201 of the ribbon 200 is in contact with the second end 202 of the ribbon 200. This has the effect that a lot of sound-absorbing material can be arranged on the inner side of the tyre 100, because, by definition, a gap would be free from sound-absorbing material. This improves the sound-absorbing properties of the tyre 100. In these embodiments, a seam is arranged between the ends 201, 202 of the ribbon 200.

As shown in FIGS. 3*c* and 5*c*, in an embodiment, a gap G is arranged between the first end 210 of the ribbon 200 and the second end 202 of the ribbon 200. However, to improve the sound-absorbing properties of the tyre 100, a maximum width Wg of the gap G is small. Herein the maximum width Wg of the gap G is defined (i.e. measured) along the body 101 of the tyre 100. The maximum width Wg of the gap G is defined (i.e. measured) in the circumferential direction SC of the tyre 100. The maximum width Wg of the gap G is at most 5 mm. Moreover, the body 101 of the tyre 100 refers to the part of the tyre 100 to which the ribbon 200 is attached. The body 101 of the tyre 100 may comprise all other parts of the tyre 100 than the ribbon 200. As shown in FIGS. 3*a* to 3*c* and 5*a* to 5*c*, in an embodiment, the seam 205 and/or the gap G widens towards the rotational axis AX of the tyre 100. Thus, the width of the gap G may be larger if measured closer to the rotational axis AX of the tyre 100.

However, to increase the amount of sound-absorbing material, preferably the first end 201 of the ribbon 200 is in contact with the second end 202 of the ribbon 200 (see FIGS. 3*a* and 3*b*).

As indicated in FIGS. 3*a* to 3*c* and 5*a* to 5*c*, and 2*a*, the shape of the ribbon 200 tapers such that a thickness Tr of the ribbon 200 decreases towards the second end 202 of the ribbon 200. This has the effect that on the side of the axis of rotation AX, i.e. on the side of the first main surface 211, the ends 201, 202 of the ribbon 200 do not compress each other. Therefore, even if there is a lot of sound-absorbing material in the tyre (as evidence by no gap or only a narrow gap G), the ends 201, 202 of the ribbon do not compress each other on the side of the axis of rotation AX, which improves the attachment of the ribbon 200 to the tyre 100 and also reduces the ends 201, 202 of the ribbon 200 grinding each other.

Figure 1C:
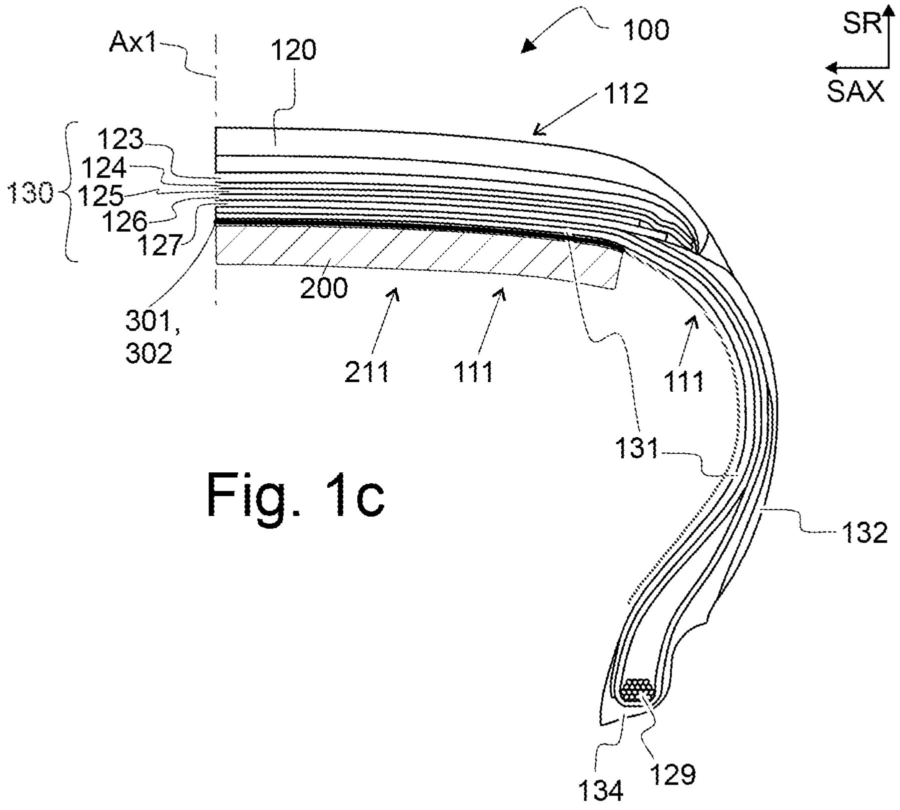
FIG. 1*c* shows a quarter of a cross section of a tyre.

FIG. 1*c* shows a quarter of a cross-section of a tyre 100. It also shows a radial direction SR (see FIG. 1*a*) and an axial direction SAX, which is parallel to the axis of rotation AX. A tubeless pneumatic tyre 100 for a vehicle comprises multiple components. A tyre 100 typically comprises an innerliner 131. Innerliner 131 refers to a layer or layers of rubber or rubber-based components. Thus, a function of the innerliner 131 is to resist air or gas diffusion, or, in other words, decrease air or gas permeability of the tyre 100. Thus, in a preferable embodiment, the tyre comprises an innerliner 131. The innerliner may comprise butyl-rubber, such as halobutyl rubber, in particular bromobutyl rubber and/or chlorobutyl rubber. The innerliner 131 or a coating thereof may form a part of the inner surface 111 of the tyre 100.

The tyre 100, in particular the body 101 thereof, comprises a reinforcement 130. The reinforcement 130 comprises at least a first ply 127 and a first metal belt 125. Preferably, the reinforcement 130 further comprises a textile belt 123, such as a textile belt 123 comprising fibrous polyamide (e.g. Nylon, aramid, or Cordura). Preferably, the reinforcement 130 further comprises the textile belt 123, a second ply 126 and a second metal belt 124. The metal belt(s) 125, 124 is/are resilient metal belts, such as steel belts comprising wires. The ply/plies 127, 126 may comprise fibrous material, e.g. Kevlar, polyamide, carbon fibres, or glass fibres. The tread 120 comprises tread blocks made of rubber material; and it may comprise also other objects such as studs.

In addition to tread area components, the pneumatic tyre 100 (and the body 101 thereof) comprises a sidewall 132. The sidewall is typically configured to withstand flexing. A bead area of the tyre 100 may comprise, for example bead base 134 configured to seat to a rim, thereby enabling a tight sealing of the tyre 100 with the wheel rim. A bead cable 129, typically comprising metal, helps seating the bead base 134 to the rim.

The tyre 100 can be manufactured by attaching a ribbon 200 to a body 101 for a tyre 100. Thus, a method for manufacturing the tyre 100 comprises receiving the body 101 for the tyre 100. The body 101 for the tyre 100 comprises an inner surface 111 opposite an outer surface 112. The body 101 also comprises the tread 120, which is provided on a part of the outer surface 112. The body 101 for the tyre 100 may comprise other parts of the tyre 100 than the ribbon 200 and the tape or adhesive (302, 301) that is used to attach the ribbon 200 to the body 101. Thus, what has been said about the structure of the tyre 100 applies to the body 101 mutatis mutandis.

The body 101 for the tyre 100 may be manufactured in the way tyres without sound-absorbing material are conventionally manufactured. Examples can be found e.g. from the publication EP 3 243 644 and references cited therein. Thus, the body 101 can be manufactured. In the alternative, the body 101 may be bought. In either case, the body 101 is provided; e.g. received. The body 101 for the tyre 100 comprises rubber.

The method comprises manufacturing a ribbon 200 from sound-absorbing material. The sound-absorbing material is physically or chemically different from the material of the body 101 for the tyre 100. The sound-absorbing material may be e.g. provided as a long band on a reel, and the ribbon 200 can be cut from the band.

In general, a sound-absorbing material may have a low density. In an embodiment, a density of the material of the ribbon 200 is less than a density of the body 101 for the tyre. In an embodiment, a density of the material of the ribbon 200 is less than 30 kg/$m^3$. The density may be more than 5 kg/$m^3$. The sound-absorbing material may be reasonably soft. The hardness of the material is preferably from 20 N to 200 N, such as 50 to 150 N. The hardness herein refers to the hardness as defined in the standard ISO 2439 ($4^{th}$ ed Dec. 15, 2008), method B, and for the indentation 40% (see section 7.4.d to 7.4.f).

In an embodiment the ribbon 200 comprises polymeric foam. Preferably, the ribbon 200 comprises polymeric foam; more preferably, the ribbon 200 consists of polymeric foam.

A matrix material of the polymeric foam is preferably selected from the group of ethylene-vinyl-acetate, polyethylene (such as LDPE and HDPE), nitrile rubber, polychloroprene, neoprene, polyimide, polypropylene (such as expanded polypropylene and polypropylene paper), polystyrene (such as expanded polystyrene, extruded polystyrene, Styrofoam, and polystyrene paper), polyurethane (such as low-resilience polyurethane, memory foam, and sorbothane), polyvinyl chloride, and silicone.

Other materials having a low density and that are suitable for use as the sound-absorbing material include aerogels, such as silica aerogels or carbon nanotube aerogels, aero graphite, metallic foams, and metallic micro lattices. Such materials that as such are hard and/or brittle may be used e.g. in the form of grains arranged in a bendable matrix material.

What has been said about the material of the ribbon 200 as such applies also to the tyre 100, of which part the ribbon 200 forms.

Figure 2A:
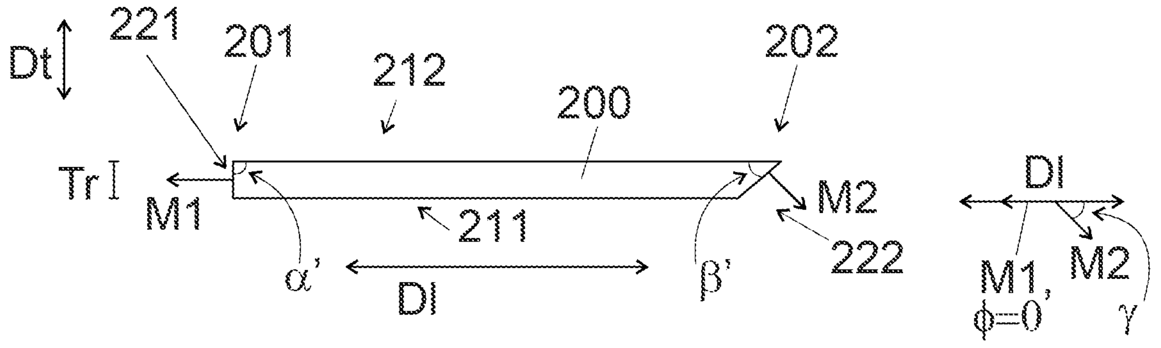
FIG. 2*a* shows in a side view a ribbon to be attached to a body of a tyre.
Figure 2B:
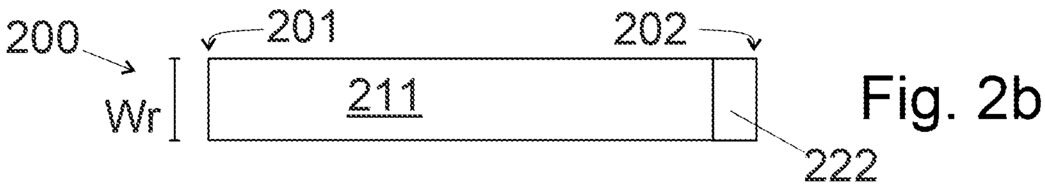
FIG. 2*b* shows in a top view a ribbon to be attached to a body of a tyre.
Figure 2C:
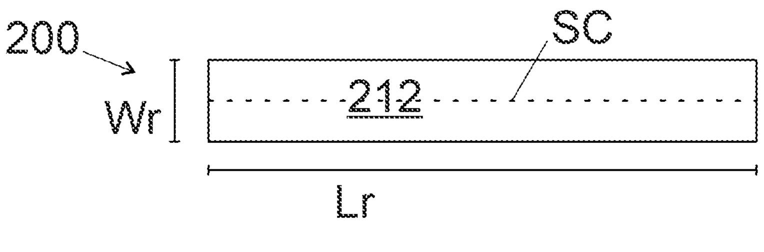
FIG. 2*c* shows in a bottom view a ribbon to be attached to a body of a tyre.

As for the shape of the ribbon 200 as such, i.e. in the context of the method, reference is made to FIGS. 2*a*, 2*b*, and 2*c*. The ribbon 200 comprises a first main surface 211 and a second main surface 212. The second main surface 212 is opposite the first main surface 211. The ribbon 200 also comprises the first end 201 and the second end 202, which is opposite the first end 201.

As for the dimensions of the ribbon 200, the ribbon 200 has a length Lr, a width Wr, and a thickness Tr. These dimensions are defined in certain directions, which are mutually perpendicular, as usually. The thickness Tr is smaller than the length Lr. The width Wr is smaller than the length Lr. Normally, the thickness Tr is smaller than the width Wr. The thickness Tr is defined in a direction Dt of the thickness Tr.

The first and second main surfaces 211, 212 are defined so that the direction Dt of the thickness Tr is normal to at least a part of the first main surface 211. Moreover, the direction Dt of the thickness Tr is normal to the second main surface 212.

To reduce the compression of the ends of the ribbon 200 at an inner side of the ribbon (as discussed above in context of the tyre), the shape of the ribbon 200 is such that the ribbon 200 tapers towards the second end 202 of the ribbon in the direction Dt of the thickness Tr, as shown in FIG. 2*a*. Referring to FIG. 2*b*, in an embodiment, the shape of the ribbon 200 is such that the ribbon 200 does not taper towards the second end 202 of the ribbon in a direction of the width Wr. I.e. in an embodiment, the width Wr is constant. However, the shape of the second main surface 212 need not be rectangular. Thus, in an embodiment, only a thickness of the ribbon reduces towards the second end 202.

The method comprises attaching the second main surface 212 of the ribbon 200 on the inner surface 111 of the body 101 for the tyre 100. Referring to FIGS. 3*a* to 3*c*, the second main surface 212 is attached in such a way that a central line CL of the ribbon 200 that is parallel to a direction Dl of the length Lr of the ribbon 200 becomes parallel to a circumferential direction SC of the body 101 for the tyre 100.

Moreover, referring to FIGS. 3*a* and 3*b*, in an embodiment, the second main surface 212 is attached in such a way that the first end 201 of the ribbon is in contact with the second end 202 of the ribbon 200. Thus, a seam 205 is formed between the ends 201, 202 of the ribbon.

In addition or alternatively, referring to FIG. 3*c*, in an embodiment, the second main surface 212 is attached in such a way that a gap G is arranged between the first end 201 of the ribbon 200 and the second end 202 of the ribbon 200. Even if the ends 201, 202 need not be in contact with each other, a maximum width Wg of the gap is at most 5 mm. As detailed in the context of the tyre, the maximum width Wg is measured along the inner surface 111 of the body 101 of the tyre 100. Moreover, the maximum width Wg is measured in the circumferential direction SC.

As readable from above, the ribbon 200 (unless covered by some material) forms a part of the inner surface of the tyre. However, because the body 101 does not comprise the ribbon 200, the inner surface of the body 101 is not formed by the ribbon 200. Moreover, in the method, before the tyre has been manufactured, the body 101 can be considered as being a body for the tyre. However, after the tyre has been made, that part can be considered as being a body of the tyre.

A length Lr of the ribbon 200 may be substantially equal to the circumference of the inner surface 111 of the body 101 for the tyre. First, these lengths may be equal. When these lengths are equal, the first end 201 of the ribbon contacts the second end 202 of the ribbon, whereby no gap is formed, at least not on the side of the second main surface 212 of the ribbon, as shown in FIGS. 3*a* and 5*a*. However, with reference to FIGS. 3*a* and 5*a* the seam/gap widens towards the axis of rotation AX. Moreover, because the length of the ribbon equals the circumference, the ribbon 200 needs not be pressed, whereby both the ends 201, 202 of the ribbon have substantially the same shape when part of the tyre 100 as when not part thereof. In such an embodiment, the second end 202 of the ribbon is not compressed against the first end 201 of the ribbon.

Second, a length Lr of the ribbon 200 may be slightly more than the circumference of the inner surface 111 of the body 101 for the tyre. Also in this case the first end 201 of the ribbon contacts the second end 202 of the ribbon, whereby no gap is formed, at least not on the side of the second main surface 212 of the ribbon, as shown in FIGS. 3*b* and 5*b*. However, with reference to FIGS. 3*b* and 5*b* the seam/gap widens towards the axis of rotation AX. Moreover, because of the difference in the lengths, the ends 201, 202 are being pressed to each other. In such an embodiment, at least a part of the second end 202 of the ribbon is compressed against the first end 201 of the ribbon. A corresponding embodiment of the method comprises compressing at least a part of the second end 202 of the ribbon against the first end 201 of the ribbon when attaching the ribbon to the body 101 of the tyre 100. For example, the length Lr of the ribbon 200 may be greater than a circumference of the body 101 for the tyre 100. The circumference of the body 101 for the tyre 100 is defined on a central line of the inner surface 111 of the body 101 for the tyre 100. For example, the length Lr of the ribbon may be 0.5 to 5 mm greater than the circumference of the body for the tyre 101.

Third, a length Lr of the ribbon 200 may be slightly less than the circumference of the inner surface 111 of the body 101 for the tyre. In this case the gap G is formed between the ends 201, 202, as shown in FIGS. 3*c* and 5*c*. As shown in these figures, the gap G widens towards the axis of rotation AX. What has been said of the maximum width Wg of the gap G applies.

Even if there is a seam between the ends 201, 202 of the ribbon 200, as in FIGS. 3*a* and 3*b*, preferably, the first end 201 of the ribbon 200 is not attached directly to the second end 202 of the ribbon 200 with adhesive or tape. Naturally both the ends 201, 202 are attached to the body 101 of the tyre 100. Correspondingly, preferably, [a] neither adhesive nor tape is arranged between the first end 201 of the ribbon 200 and the second end 202 of the ribbon 200 (as in FIGS. 3*a* and 3*b*) or [b] adhesive or tape is arranged between the first end 201 of the ribbon 200 and the second end 202 of the ribbon 200 only on the inner surface of the body 101 of the tyre (as the case may be in FIG. 3*c*). Concerning the latter (i.e. [b]), adhesive may be provided on the inner surface of the body of the tyre at the location of the gap G. Concerning the latter (i.e. [b]), adhesive need not be provided on the inner surface of the body of the tyre at the location of the gap G.

In particular, in an embodiment, the ribbon 200 comprises a first end surface 221 and a second end surface 222, and neither adhesive not tape is provided on either of the first end surface 221 and the second end surface 222. These end surfaces 221, 222 will be defined in more detail later. Having these end surfaces 221, 222 free of adhesive and tape has the benefit that the tyre 100 is easier to manufacture. It suffices to provide adhesive or tape on one of: [i] the inner surface 111 of the body 101 for the tyre or [ii] the first main surface 212 of the ribbon 200. Such a process can be automated much more easily than one wherein adhesive is provided also on an end surface 221, 222 to join the end surfaces together.

An embodiment of the method comprises attaching the second main surface 212 of the ribbon 200 to the inner surface 111 of the body 101 for the tyre using adhesive 301 and/or tape 302, such as double-sided tape. A tyre 100 made in such a way comprises adhesive 301 and/or tape 302, by which the ribbon 200 has been attached to the body 101 of the tyre 100. A tape comprises carrier material and adhesive on at least one side of the carrier. Double-sided tape comprises the carrier material and adhesive on both sides of the carrier. The adhesive or the tape made be applied in the form of stripes. Such stripes may extend e.g. on an inner surface 111 of the body 101 for the tire in the circumferential direction SC. Such stripes may extend e.g. on the second main surface 212 of the ribbon in the longitudinal direction Dl.

Referring to FIG. 2*a*, in an embodiment, the ribbon 200 does not taper towards the first end 201. Thus, in an embodiment, the shape of the ribbon 200 is non-tapering towards the first end 201 of the ribbon 200. In other words, in this embodiment, the thickness of the ribbon does not decrease towards the first end 201. Moreover, in this embodiment, the width of the ribbon does not decrease towards the first end 201.

Figure 6A:
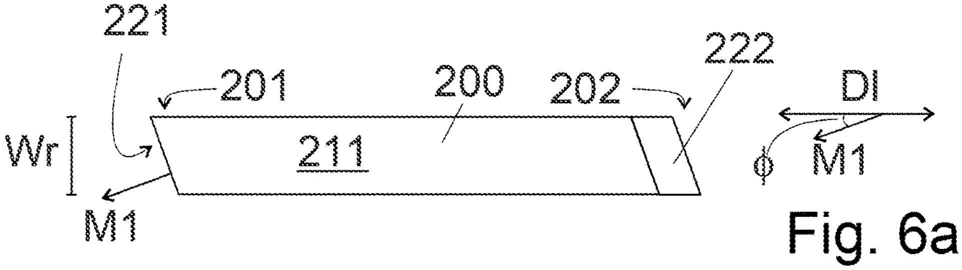
FIG. 6*a* shows in a top view a ribbon to be attached to a body of a tyre.
Figure 6B:
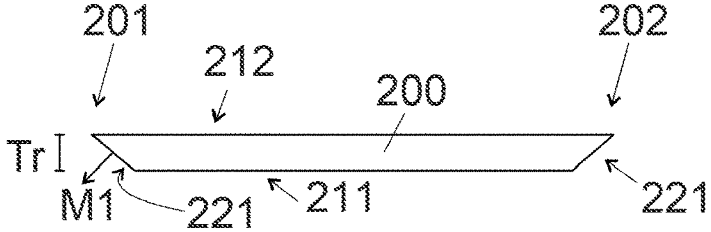
FIG. 6*b* shows in a side view a ribbon to be attached to a body of a tyre.

Referring to FIG. 2*a*, the shape of the first end 201 of the ribbon 200 defines a first angle of inclination a'. The first angle of inclination a' may be e.g. 90 degrees, e.g. in the case the first end 201 is not tapering. However, as shown in FIG. 6*b*, in an embodiment, the shape of the ribbon 200 is tapering also towards the first end 201 of the ribbon 200. In such a case, the first angle of inclination a' is less than 90 degrees. Preferably, the first angle of inclination a' is at least 30 degrees, more preferably at least 80 degrees, such as 90 degrees. The first angle of inclination a' herein refers to a minimum angle between the two planes defined by the first end surface 221 (which preferably is planar) and the second main surface 212 (which preferably is planar).

Referring to FIG. 2*a*, because the ribbon 200 tapers at least towards the second end 202, a second angle of inclination b' is formed at the second end 202. The second angle of inclination b' is less than 90 degrees and may be e.g. at most 75 degrees. Preferably, the second angle of inclination b' is 15 to 75 degrees, e.g. 30 to 60 degrees, e.g. about 45 degrees, such as 40 to 50 degrees. The second angle of inclination b' herein refers to a minimum angle between the two planes defined by the second end surface 222 (which preferably is planar) and the second main surface 212 (which preferably is planar).

Figure 1D:
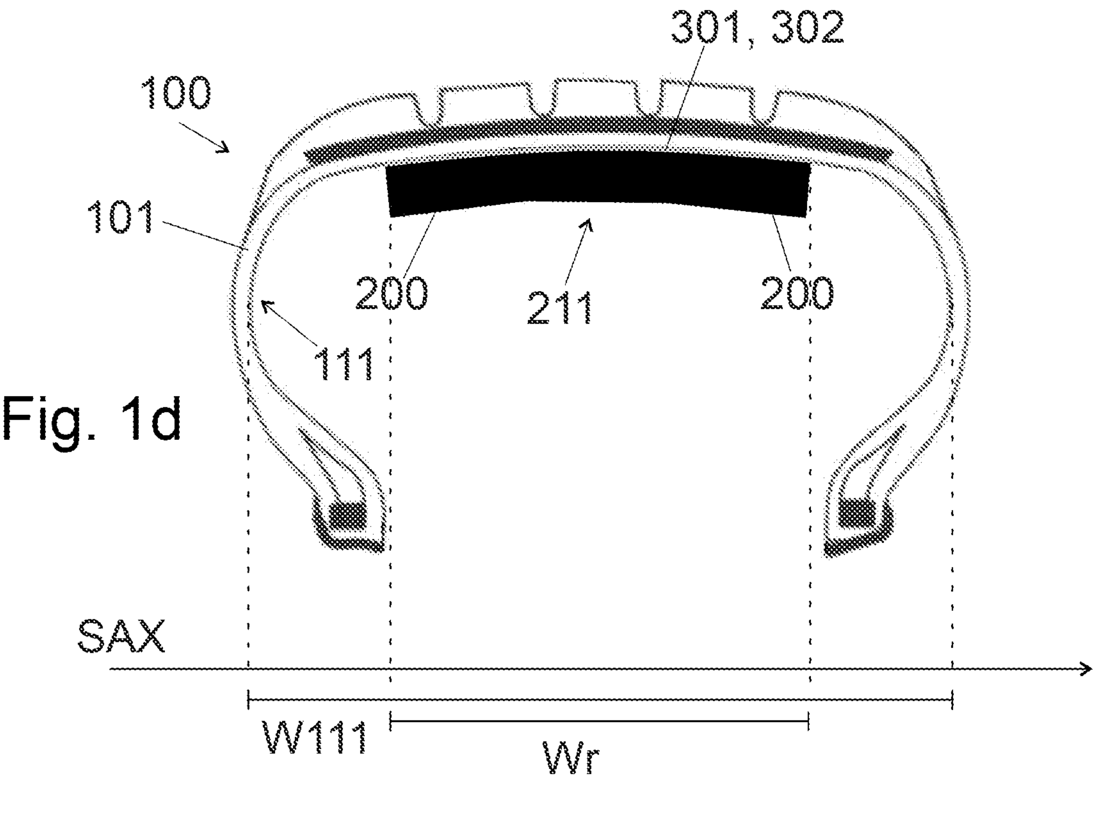
FIG. 1*d* shows a half of a cross section of a tyre.
Figure 1E:
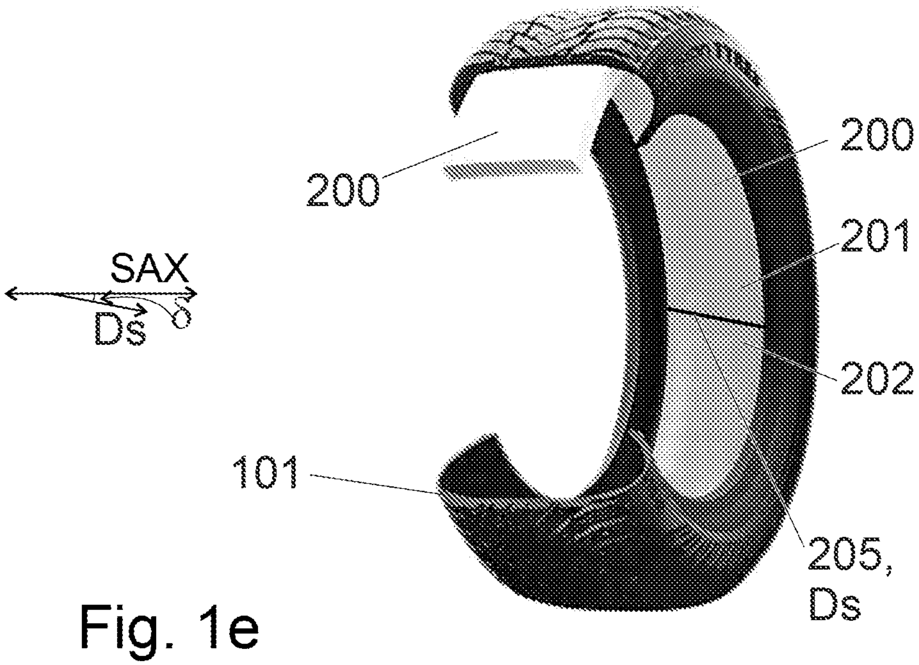
FIG. 1*e* shows in a perspective view, an exploded view of some parts of a tyre.
Figure 1F:
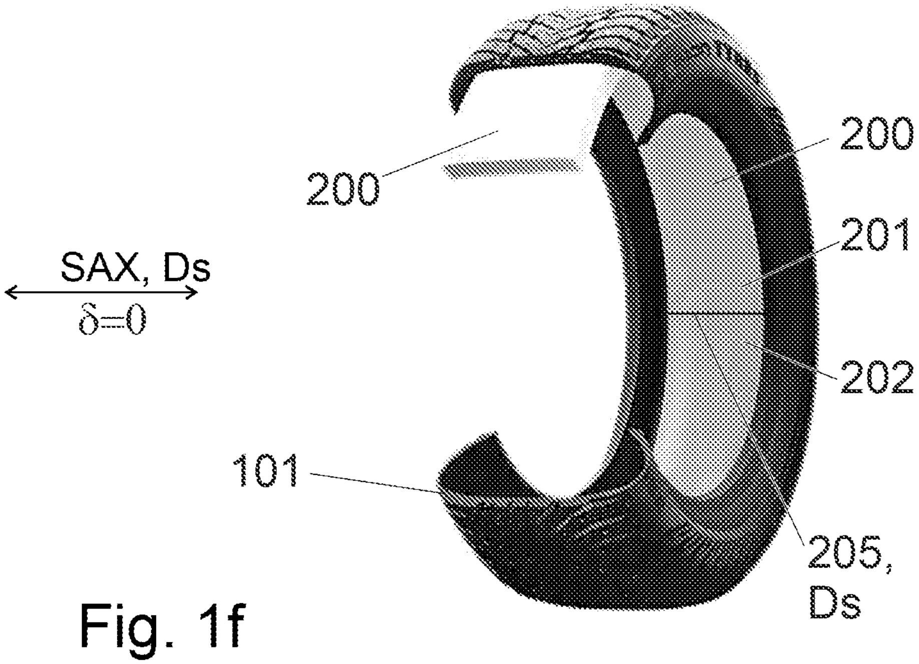
FIG. 1*f* shows in a perspective view, an exploded view of some parts of a tyre.

Referring to FIGS. 1*e* and 1*f*, it is noted that in the tire 100 the seam 205 and/or the gap G extend/extends from one side of the ribbon 200 to another, opposite side of the ribbon 200, and it/they extend/extends in a first direction Ds in this way. Within this description the term "direction" refers to two directions that are reverse to each other.

Most preferably, the first direction Ds is parallel to an axial direction SAX of the tyre 100 as in FIG. 1*f*. The axial direction SAX is a direction that is parallel to the axis of rotation AX. The first direction Ds need not be parallel to an axial direction SAX, as in FIG. 1*e*. However, in an embodiment, the first direction Ds or forms a third minimum angle d of at most 15 degrees with the axial direction SAX of the tyre 100. The term "minimum angle" is used, because, when a direction refers to two reverse directions, two directions form four angles, of which at most two are different, and the smaller of these is referred to here, unless there is only the one straight angle, which then is the minimum angle. This applies to also other angles that will be discussed.

When the first direction Ds is parallel to an axial direction SAX of the tyre 100, in the method, the second main surface 212 is rectangular. In the context of the method, this is preferable. Reference is made to FIG. 2*c*. However, since the third minimum angle d needs not be zero, the second main surface 212 needs not be rectangular, as readable from in FIG. 6*a* (note that the second main surface 212 remains opposite the first main surface 211 shown in FIG. 6*a*).

In an embodiment of the method, the second main surface 212 of the ribbon is quadrangular such that each angle is 75 to 105 degrees (in line with the third minimum angle d). As readable from FIG. 6*a*, when the third minimum angle d is not zero, a third normal M1 (see FIG. 2*a*) is not parallel to the direction Dl of length (as evidenced by the fourth minimum angle f), even if the first angle of inclination a' is 90 degrees.

A small third minimum angle d (e.g. zero) has the effect that the seam/gap remains short, whereby the inclined second end 202 takes up less space that in case the third minimum angle d would be larger. Thus, this is beneficial from the point of view of suppressing noise of the tyre. FIG. 1*e* shows an embodiment, wherein the third minimum angle d is small but not zero, and FIG. 1*f* shows a preferable embodiment, wherein the third minimum angle d is zero.

The first angle of inclination a' and the second angle of inclination b' relate to some other angles, too, observable from the tyre 100 and/or the ribbon 200.

Concerning first the tyre 100 and with reference to FIG. 5*a* (and FIGS. 3*a* and 2*a*) the first end 201 of the ribbon 200 having the first angle of inclination a' also has a first end surface 221. Thus, in an embodiment, the ribbon 200 (as such or as part of the tyre 100) comprises a first end surface 221 at the first end 201. In a similar way the second end 202 of the ribbon 200 having the second angle of inclination b' also has a second end surface 222. Thus, in an embodiment, the ribbon 200 (as such or as part of the tyre 100) comprises a second end surface 222 at the first end 202. In the embodiments of FIGS. 5*b* and 5*c* the ribbon 200 comprises such first and second end surfaces, even if not shown in those figures by a reference numeral.

Referring to FIG. 5*a*, in an embodiment, a first normal N1 of the whole first end surface 221 is perpendicular to a radial direction SR of the tyre at the location of the first normal N1. In other words, the in an embodiment, a first normal N1 the whole first end surface 221 is parallel to a circumferential direction SC of the tyre at the location of the first normal N1 (i.e. at a location of the body 101 of the tire, the location of the body 101 being arranged on a same radial line as the point at which the first normal N1 is defined). Herein the term parallel covers the options of being unidirectional or being reverse.

In FIG. 5*a*, the first normal N1 is normal to the whole first end surface 221, because the first end surface 221 is planar. In a preferable embodiment, the first end surface 221 is planar. This is beneficial from manufacturing point of view, because then the ribbon 200 can simply be cut from a band. However, only a part of the first end surface 221 may be planar. Moreover, the first end surface 221 needs not be planar. Thus, in an embodiment, a first normal N1 of a part of the first end surface 221 is perpendicular to a radial direction SR of the tyre at the location of the first normal N1. In other words, in an embodiment, a first normal N1 of a part of the first end surface 221 is parallel to a circumferential direction SC of the tyre at the location of the first normal N1.

However, as detailed above, the first angle of inclination a' need not be 90 degrees (see e.g. FIG. 6*b*), whereby the first normal N1 needs not be parallel to the circumferential direction SC or perpendicular to the radial direction SR.

In an embodiment, a first normal N1 of the whole first end surface 221 or a part of the first end surface 221 forms a first minimum angle a of at least 30 degrees, preferably at least 60 degrees, most preferably at least 80 degrees, with a radial direction SR of the tyre. Herein the radial direction is defined at that location (or radially outward, as indicated above). Reference is made to FIG. 5*a*. The term minimum angle is used, because both the first normal N1 and the radial direction SR are considered to be definable in two opposite directions resulting at most two different angles. Correspondingly, in an embodiment, a first normal N1 of the whole first end surface 221 or a part of the first end surface 221 forms a minimum angle of at most 60 degrees, preferably at most 30 degrees, most preferably at most 10 degrees, to a to a circumferential direction SC of the tyre at the location of the first normal N1. Thus, the first angle of inclination a' may be e.g. at least 30 degrees, at least 60 degrees, or at least 80 degrees, such as 90 degrees. Correspondingly, the third minimum angle d may be e.g. at most 10 degrees; and the second main surface 212 of the ribbon may be quadrangular such that each angle is 80 to 100 degrees.

Referring to FIG. 5*a*, in an embodiment, a second normal N2 of the whole second end surface 222 forms a second minimum angle b of at most 75 degrees with a radial direction SR of the tyre, wherein the radial direction SR is defined at the location of the second normal N2 (i.e. at a location of the body 101 of the tire, the location of the body 101 being arranged on a same radial line as the point at which the second normal N2 is defined). Reference is made to FIG. 5*a* with the note that the curvature of the body 101 is highly exaggerated. Thus, in an embodiment, the second normal N2 of the whole second end surface 222 forms a minimum angle of least 15 degrees with a circumferential direction SC of the tyre at the location of the second normal N2. Thus, the second angle of inclination b' may be e.g. at most 75 degrees.

In an embodiment, the second minimum angle b is 15 to 75 degrees, preferably 30 to 60 degrees, and more preferably 40 to 50 degrees, such as 45 degrees. The upper limit relates to a sufficient amount of tapering in view of e.g. reducing the wear problems at the ends 201, 202 of the ribbon, and the lower limit ensures sufficient mass balance and amount of sound-absorbing material.

The second surface normal N2 is a normal of the whole the second end surface 222 when the second end surface 222 is planar. In a preferably embodiment, the second end surface 222 is planar. In an embodiment, at least the part of the second end surface 222 is planar. However, the second end surface 222 needs not be planar. Thus, in an embodiment, a second normal N2 of a part of the second end surface 222 forms the second minimum angle b with the radial direction SR, the value of the second minimum angle b being discussed in detail above.

These values of the first minimum angle a and the second minimum angle b apply particularly when the third minimum angle d is small in the meaning discussed above.

Figure 4A:
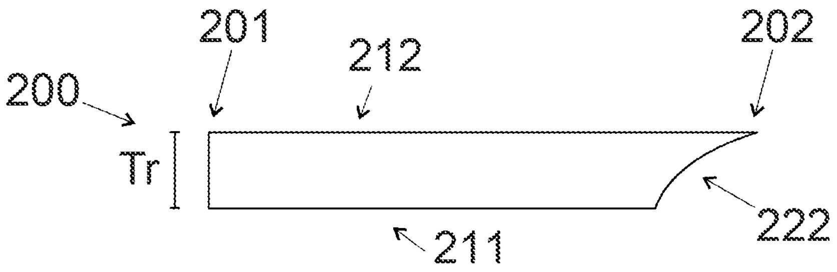
FIG. 4*a* shows in a side view a ribbon to be attached to a body of a tyre.
Figure 4B:
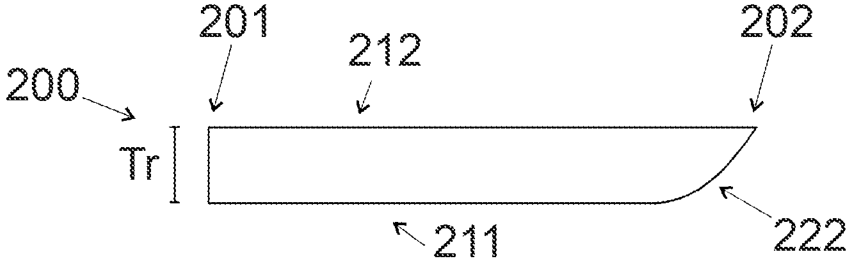
FIG. 4*b* shows in a side view a ribbon to be attached to a body of a tyre.

As for the shape of the first end surface 221 and the second end surface 222, FIGS. 4*a* and 4*b* show embodiment wherein the second end surface 222 is not planar. However, as conventional, a normal (e.g. the second normal N2 discussed above) of such a surface is definable as a normal of a tangential plane of the surface.

However, as detailed above, preferably the first angle of inclination a' is about 90 degrees, the second angle of inclination b' is about 45 degrees, and the third minimum angle d is small (e.g. less than 15 degrees). How these relate to the tire, particularly the first and second minimum angles a and b was discussed above.

The preferable values for the first angle of inclination a' and the second angle of inclination b' are observable also from the ribbon 200 as such (i.e. in the context of method, before the ribbon 200 has been attached to the body 101 of the tyre). In an embodiment, the ribbon 200 comprises a first end surface 221 at the first end 201 of the ribbon 200 and a second end surface 222 at the second end 202 of the ribbon 200.

Concerning the first angle of inclination a', in more specific terms, in an embodiment of the method the direction Dl of the length Lr of the ribbon 200 is parallel or forms a fourth minimum angle f of at most 60 degrees with a third normal M1, the third normal M1 being a normal of a part of the first end surface 221 or a normal of the whole first end surface 221. The fourth minimum angle f is shown in FIGS. 2*a* and 6*a*. Even if not shown, clearly also in the embodiment of FIG. 6*b*, the fourth minimum angle f is greater than zero. Preferably, the first end surface 221 is planar, and the third normal M1 is a normal of the whole first end surface 221. More preferably, the direction Dl of the length Lr of the ribbon 200 is parallel or forms the fourth minimum angle f of at most 30, such as at most 10 degrees, with the third normal M1 of a part of the first end surface 221 or the third normal M1 of the whole first end surface 221. It is noted that both the first angle of inclination a' and the third minimum angle d affect the fourth minimum angle f defined above. Correspondingly, the third minimum angle d may be e.g. at most 10 degrees; and the second main surface 212 of the ribbon may be quadrangular such that each angle is 80 to 100 degrees.

Concerning the second angle of inclination b', in more specific terms, in an embodiment of the method the direction Dl of the length Lr of the ribbon 200 forms a fifth minimum angle g of at least 15 degrees with a fourth normal M2 of a part of the second end surface 222 or the whole second end surface 222. Reference is made to FIG. 2*a*. Preferably the second end surface 222 is planar and the fourth normal M2 is a normal of the whole second end surface 222. The lower limit for the fifth minimum angle g ensures sufficient tapering.

In an embodiment, the direction Dl of the length Lr of the ribbon 200 forms the fifth minimum angle g of 15 to 75 degrees, preferably 30 to 60 degrees, more preferably 40 to 50 degrees, with the fourth normal M2; which is a normal of a part of the second end surface 222 or a normal of the whole second end surface 222. The upper limit for the fifth minimum angle g ensures sufficient length of non-tapering part, which affect both sound-suppressing properties and mass balance of the tire.

As detailed above, most preferably the first angle of inclination a' is 90 degrees, the second angle of inclination b' is 45 degrees and the third minimum angle d is zero degrees. Thereby, in that embodiment, the first minimum angle a is 90 degrees, the second minimum angle b is 45 degrees, the fourth minimum angle f is zero, and the fifth minimum angle g is 45 degrees.

In an embodiment a thickness Tr of the ribbon 200 is 10 mm to 75 mm, preferably 20 mm to 60 mm, more preferably 30 mm to 50 mm. In particular, these values of thickness apply to the non-tapering part of the ribbon 200. Given that the second angle of inclination b' may be e.g. 45 degrees and that a radius of a tyre is typically at least 30 cm (making a circumference of the inner surface 111 about 190 cm), obviously a major portion of the ribbon 200 has a constant thickness. In an embodiment, the ribbon 200 has a constant thickness within an area of the second main surface 222, the area being at least 80% of the area of the second main surface 222. The constant thickness within this area may be within the limits disclosed above for the thickness. Naturally, within the tapering part of the ribbon 200, the thickness may be less, and may decrease continuously to zero.

Referring to FIG. 1*d*, in an embodiment, the width Wr of the ribbon 200 is proportional to a width of the tyre 100 and/or the body 101 of the tyre. In an embodiment, the width Wr of the ribbon 200 is at least ¼ (i.e. at least 25%) of a width W111 of a normal projection of the inner surface 111 to a plane comprising a rotational axis AX of the body 101 of the tyre 100. FIG. 1*d* does not show such a plane; however, an axial direction SAX is depicted therein, and the rotational axis AX is parallel to the axial direction SAX. Moreover, because the aforementioned projection is a normal projection, the widths W111 is independent of how far away the plane is from the inner surface 111. In any case, the width Wi ii is depicted in FIG. 1*d* as well as the width Wr of the ribbon 200. Preferably, the width Wr of the ribbon 200 is at least ⅓ (i.e. at least 33%) of the width W111 of the normal projection of the inner surface 111 to the plane comprising a rotational axis AX of the body 101 of the tyre 100.

The invention claimed is:

1. A tyre comprising:

an inner surface opposite an outer surface, a tread forming a part of the outer surface, and a ribbon comprising sound-absorbing material such that at least a part of the ribbon is arranged opposite the tread, the ribbon extends from a first end of the ribbon to a second end of the ribbon, the shape of the ribbon tapers such that a thickness of the ribbon decreases towards the second end of the ribbon, and the first end of the ribbon is in contact with the second end of the ribbon, a seam is arranged between the first end of the ribbon and the second end of the ribbon, at least a part of the seam widens towards a rotational axis of the tyre, the ribbon comprises a first end surface at the first end and a second end surface at the second end, a first normal of a part of the first end surface or the whole first end surface is perpendicular to a radial direction of the tyre or forms a first minimum angle of at least 80 degrees with a radial direction of the tyre, and a second normal of a part of the second end surface or the whole second end surface forms a second minimum angle of 15 to 75 degrees with a radial direction of the tyre, wherein at least a part of the second end of the ribbon is compressed against the first end of the ribbon, and the first end of the ribbon is not attached directly to the second end of the ribbon with adhesive or tape.

2. The tyre of claim 1, wherein: the part of the second end surface is planar or the whole second end surface is planar.

3. The tyre of claim 2, wherein:

the part of the second end surface is planar or the whole second end surface is planar and the part of the first end surface is planar or the whole first end surface is planar.

4. The tyre of claim 1, wherein:

the second normal of the part of the second end surface or the second normal of the whole second end surface forms the second minimum angle of 30 to 60 degrees, with a radial direction of the tyre.

5. The tyre of claim 1, wherein:

the seam extends in a first direction, and the first direction is parallel to an axial direction of the tyre or forms a third minimum angle of at most 15 degrees with the axial direction of the tyre.

6. The tyre of claim 1, comprising:

adhesive and/or tape attaching the ribbon to the body of the tyre.

7. The tyre of claim 1, wherein:

the shape of the ribbon is non-tapering towards the first end of the ribbon at least in the direction of thickness of the ribbon.

8. The tyre of claim 7, wherein:

the shape of the ribbon is, in a direction of the width of the ribbon, non-tapering towards the second end of the ribbon; and the shape of the ribbon is, in a direction of the width of the ribbon, non-tapering towards the first end of the ribbon.

9. The tyre of claim 1, wherein:

the body of the tyre comprises rubber; and a density of the material of the ribbon is less than 30 $kg/m^3$ and/or the ribbon comprises polymeric foam;

the ribbon comprises polymeric foam or consists of polymeric foam, wherein a polymer matrix material of the polymeric foam is selected from the group of ethylene-vinyl-acetate, polyethylene, nitrile rubber, polychloroprene, neoprene, polyimide, polypropylene, polystyrene, polyurethane, polyvinyl chloride, and silicone.

10. The tyre of claim 1, wherein:

a thickness of the ribbon is 10 mm to 75 mm.

11. The tyre of claim 1, wherein:

a width of the ribbon is at least ¼ of a width of a normal projection of the inner surface to a plane comprising a rotational axis of the body of the tyre.

12. The tyre of claim 1, wherein a part of the seam extends from the inner surface of the tyre towards a rotational axis of the tyre without widening.

* * * * *